(12) United States Patent
Pagoni et al.

(10) Patent No.: US 12,119,711 B2
(45) Date of Patent: Oct. 15, 2024

(54) ROTOR FOR AN ELECTRIC MACHINE AND METHOD FOR PRODUCING A ROTOR

(71) Applicant: Robert Bosch GmbH, Stuttgart (DE)

(72) Inventors: Thomas Pagoni, Filderstadt (DE);
Robert Bonasewicz, Stuttgart (DE);
Simon Mensak, Ludwigsburg (DE);
Marco Eitzert, Schwenningen (DE)

(73) Assignee: Robert Bosch GmbH, Stuttgart (DE)

( * ) Notice: Subject to any disclaimer, the term of this patent is extended or adjusted under 35 U.S.C. 154(b) by 227 days.

(21) Appl. No.: 17/779,912

(22) PCT Filed: Oct. 22, 2020

(86) PCT No.: PCT/EP2020/079782
§ 371 (c)(1),
(2) Date: May 25, 2022

(87) PCT Pub. No.: WO2021/104765
PCT Pub. Date: Jun. 3, 2021

(65) Prior Publication Data
US 2022/0416599 A1 Dec. 29, 2022

(30) Foreign Application Priority Data
Nov. 28, 2019 (DE) ...................... 10 2019 218 437.5

(51) Int. Cl.
*H02K 1/27* (2022.01)
*H02K 1/2733* (2022.01)
*H02K 15/03* (2006.01)

(52) U.S. Cl.
CPC ........... *H02K 1/2733* (2013.01); *H02K 15/03* (2013.01); *H02K 2213/03* (2013.01)

(58) Field of Classification Search
CPC ........... H02K 1/27; H02K 1/273; H02K 15/03
(Continued)

(56) References Cited

U.S. PATENT DOCUMENTS

| | | | | |
|---|---|---|---|---|
| RE36,367 E | * | 11/1999 | Nagate | H02K 1/2746 310/152 |
| 6,509,667 B1 | * | 1/2003 | El-Antably | H02K 15/02 310/43 |

(Continued)

FOREIGN PATENT DOCUMENTS

| | | |
|---|---|---|
| DE | 10 2012 212 772 A1 | 1/2014 |
| DE | 20 2017 100 697 U1 | 2/2017 |

(Continued)

OTHER PUBLICATIONS

International Search Report corresponding to PCT Application No. PCT/EP2020/079782, mailed Jan. 14, 2021 (German and English language document) (6 pages).

*Primary Examiner* — Rashad H Johnson
(74) *Attorney, Agent, or Firm* — Maginot, Moore & Beck LLP (57) ABSTRACT

A rotor for an electric machine, in particular for a brushless DC motor, includes a hollow cylindrical main body that is rotationally fixed to a machine shaft. The main body includes a plurality of radial protrusions arranged over its casing surface in the circumferential direction and in the axial direction and offset relative to one another by a defined offset angle. Each radial protrusion is limited over an angular range, which is smaller than the offset angle. The hollow cylindrical main body is permanently connected, in particular adhered, to a hollow cylindrical body surrounding same in the circumferential direction by way of a joining process. A method for producing a rotor for an electric machine is also disclosed. The method includes (i) using rotor laminations for a rotor lamination stack of the rotor, wherein a plurality of rotor laminations have a respective at least one radial protrusion that is limited over an angular range, (ii) stacking the rotor laminations to form the rotor lamination stack in such a way that, of the plurality of rotor laminations having at least one radial protrusion, neighboring rotor laminations are rotated relative to one another about a defined offset angle that is greater than the angular range of the at least one radial protrusion, (iii) applying a joining agent, in particular an adhesive, to an outer casing of the rotor lamination stack, preferably between the radial protrusions, and/or to an inner surface of a hollow cylindri- (Continued)

cal body, and (iv) sliding the hollow cylindrical body onto the rotor lamination stack. An electric machine is also disclosed that includes a corresponding rotor, as well as an electrical processing device having a corresponding electric machine.

19 Claims, 6 Drawing Sheets

(58) Field of Classification Search
USPC ................................................ 310/156.01
See application file for complete search history.

(56) References Cited

U.S. PATENT DOCUMENTS

| | | | |
|---|---|---|---|
| 2005/0225190 A1* | 10/2005 | Kinashi | ............... H02K 1/2733 |
| | | | 310/156.43 |
| 2010/0045132 A1 | 2/2010 | Zaps | |
| 2014/0028121 A1 | 1/2014 | Bekavac et al. | |
| 2014/0042861 A1* | 2/2014 | Kawaji | ................. H02K 1/276 |
| | | | 310/156.53 |
| 2018/0233977 A1* | 8/2018 | Volkmuth | .............. H02K 9/197 |
| 2018/0254687 A1* | 9/2018 | Höber | .................... H02K 15/02 |
| 2018/0287439 A1* | 10/2018 | Degner | ............... H02K 1/2766 |
| 2018/0337565 A1* | 11/2018 | Reddy | .................. H02K 19/103 |
| 2019/0181703 A1* | 6/2019 | Kurfuerst | ................ H02K 1/32 |
| 2019/0288584 A1* | 9/2019 | Vansompel | ............ H02K 9/227 |
| 2023/0412054 A1* | 12/2023 | Schmidt | ................ A47J 43/085 |
| 2024/0079928 A1* | 3/2024 | Mizuno | ................. H02K 1/148 |

FOREIGN PATENT DOCUMENTS

| | | |
|---|---|---|
| DE | 11 2015 004 911 T5 | 7/2017 |
| EP | 1 737 105 A2 | 12/2006 |
| JP | 2019-71764 A | 5/2019 |
| WO | 2007/067738 A2 | 6/2007 |
| WO | 2008/019932 A1 | 2/2008 |

* cited by examiner

ROTOR FOR AN ELECTRIC MACHINE AND METHOD FOR PRODUCING A ROTOR

This application is a 35 U.S.C. § 371 National Stage Application of PCT/EP2020/079782, filed on Oct. 22, 2020, which claims the benefit of priority to Serial No. DE 10 2019 218 437.5, filed on Nov. 28, 2019 in Germany, the disclosures of which are incorporated herein by reference in their entirety.

The disclosure relates to a rotor for an electric machine and method for producing a rotor of the type described in the independent claims. The disclosure moreover relates to an electric machine with the rotor according to the disclosure or with a rotor produced according to the method according to the disclosure, and to an electric treatment device with a corresponding electric machine.

BACKGROUND

A brushless direct-current machine, also referred to below in short as a BLDC, or an electronically commutated (EC) machine is understood to mean in particular an electric machine with a three-phase stator winding which can be controlled in an open or closed loop in such a way that a rotating magnetic field, which entrains a permanently excited rotor, is generated. It is alternatively also conceivable to use the rotor according to the disclosure in conjunction with a generator.

Rotors for brushless direct-current machines with permanently excited magnets are usually produced in two different embodiments. On the one hand, the permanent magnets of different polarity can be buried in so-called "pockets" of a hollow-cylindrical core and, on the other hand, it is possible to apply the magnets or a magnetic ring, correspondingly alternately polarized, to the outside of the core as surface magnets.

The core usually consists of a plurality of rotor laminations, each punched from magnetically soft sheet metal, which are stacked to form a rotor blade stack. Other designs of rotors for electric machines, in particular for EC machines, are, however, also conceivable. Thus, the hollow-cylindrical core of the rotor can be manufactured from soft magnetic composites. Soft magnetic composites consist of high-purity iron powder with a special surface coating on each individual particle. This electrically insulating surface ensures high electrical resistance even after pressing and heat treatment, which in turn entails minimization or prevention of eddy-current losses. Soft magnetic composites are known to a person skilled in the art such that no more will be said here concerning their composition.

The permanent magnets or the surface magnets of the magnetic ring consist in particular of a magnetically hard material, for example an iron, cobalt, or nickel alloy. Plastic-bonded permanent magnets which have magnetic powder embedded in a plastic binder matrix are also conceivable. The magnetic powder can consist, for example, of hard ferrite, samarium cobalt, and/or neodymium or take the form of an AlNiCo alloy. The plastic binder preferably takes the form of a thermoplastic binder, for example made from polyamide or from polyphenylene sulfide. It is alternatively also conceivable that the plastic binder takes the form of a thermosetting binder, for example an epoxy resin.

Alongside their numerous advantages with respect to buried magnets, surface magnets have the disadvantage of lower magnetic resistance to centrifugal forces which act on the surface magnets when the electric machine is operating. In addition to the mechanical resistance of the surface magnets themselves, their fastening to the core therefore also has an important role to play in order to prevent defects and failures.

US 2010/0045132 A1 discloses a rotor for an electric machine, wherein the rotor takes the form of a rotor blade stack consisting of a plurality of rotor laminations. Each rotor lamination is punched from a piece of sheet metal and has three radial projections and three radial indentations over their circumference, wherein the projections and the indentations each extend over an angular range of 60°. Adjacent rotor laminations are stacked with an offset angle of 60° relative to one another so that an adhesive can be spread over the projections and indentations during a joining process to a hollow-cylindrical body that takes the form of a magnetic ring. In order to obtain a defined gap between the projections of the rotor blade stack and the hollow-cylindrical body, specially shaped spacers are introduced into the adhesive such that in particular temperature-related expansions of the rotor blade stack when the electric machine is highly stressed cannot cause the magnetic ring to be damaged, in particular to rupture.

Various constraints, such as, for example, maintaining a defined bonding gap to ensure the curing of the adhesive, need to be taken into account for the mechanical properties of the adhesive connection between the core and the hollow-cylindrical body surrounding the latter. However, despite the incorporation of corresponding spacers, this bonding gap can result in concentricity errors of the rotor at the magnet surface. However, in order to be able to maintain any concentricity tolerances, time-consuming quality checks (for example, 100% measurement of the actual concentricity) are required. The measurements and the resulting rejected components here directly affect the production costs of the electric machine.

The object of the disclosure is to provide a rotor for an electric machine, in particular for a brushless direct-current machine, which, with minimal play between a core of the rotor and a hollow-cylindrical body surrounding the latter, on the one hand has optimal concentricity properties and, on the other hand, maintains a defined bonding gap which ensures optimal spreading and curing of the adhesive without the incorporation of additional spacer particles.

SUMMARY

The disclosure relates to a rotor for an electric machine, in particular for a brushless direct-current machine, with a hollow-cylindrical core, which is connected non-rotatably to a machine shaft. In order to achieve the object set, it is provided that the core has a plurality of radial bulges which are offset relative to one another by a defined offset angle in the circumferential direction and in the axial direction over its outer surface, wherein each radial bulge is delimited over an angular range which is smaller than the offset angle, and wherein the hollow-cylindrical core is permanently connected, in particular adhesively bonded, to a hollow-cylindrical body surrounding the latter in the circumferential direction by means of a joining process.

A defined bonding gap between the core and the hollow-cylindrical body of the rotor can in this way be obtained particularly advantageously, by means of which, on the one hand, the required mechanical resistance of the adhesive connection is ensured and which, on the other hand, minimizes the play between the two components of the rotor which are to be joined in order in this way to prevent any concentricity errors and resulting rejected components. The radial bulges locally narrow the play between the components to be joined such that the possible concentricity errors are minimized directly without the additional incorporation of additional spacer particles. In contrast, the defined bonding gap is ensured in all other regions between the two components in order to ensure the curing of the adhesive and hence the mechanical resistance of the adhesive connection. In addition, the disclosure ensures axial and radial permeability of the adhesive such that it can spread unhindered in the whole bonding gap during the joining procedure.

The hollow-cylindrical core is formed by a rotor blade stack consisting of rotor laminations, wherein a plurality of rotor laminations each have at least one radial bulge and adjacent rotor laminations of the plurality of rotor laminations with at least one radial bulge are rotated relative to one another by an offset angle. A rotor blade stack can be constructed particularly simply from a stack of rotor laminations and, in addition, makes it possible to ensure a magnetic circuit particularly effectively. By virtue of the plurality of adjacent rotor laminations with a radial bulge and rotated relative to one another by an offset angle, it is possible to selectively influence the requirements of the adhesive used with regard to its permeability and curing. Because of the axial and radial empty spaces between the radial bulges, the adhesive can furthermore effectively spread over the whole circumference of the bonding gap and is not hampered by local accumulations of material at the bulges.

The hollow-cylindrical body can, for example, take the form of a magnetic ring, a protective sleeve, or a sensor ring. In addition, it is not necessary that the hollow-cylindrical body completely surrounds the core in the axial direction of the machine shaft. Likewise, hollow-cylindrical bodies, which can be shorter but also longer than the core over their circumference at least in some regions, are also conceivable.

In a further embodiment of the disclosure, each rotor lamination of the rotor blade stack has at least one radial bulge and is rotated by the offset angle with respect to its adjacent rotor lamination. This enables particularly simple production of the rotor blade stack because all the rotor laminations can have an identical form and hence there is no need to take into account any particular order of different rotor laminations when forming the stack.

The offset angle of adjacent rotor laminations with at least one radial bulge here corresponds to at least twice the value of the angular range of the at least one radial bulge. The offset angle is preferably at least 30°, particularly preferably approximately 60°. Depending on the adhesive used and the associated optimal bonding gap or joining procedure, the radial bulges of the core or the rotor blade stack over an angular range of less than 30°, preferably less than 20°, particularly preferably approximately 10°, exceed the maximum radius that exists over the remaining outer surface of the core or the rotor blade stack by approximately 0.01 to 5%, preferably by approximately 0.02% to 2%.

The disclosure moreover relates to a method for producing a rotor for an electric machine, in particular for a brushless direct-current machine, wherein at least the following steps are performed in order to achieve the set object:
  Using rotor laminations for a rotor blade stack of the rotor, wherein a plurality of rotor laminations each have at least one radial bulge delimited over an angular range,
  Stacking the rotor laminations to form the rotor blade stack in such a way that adjacent rotor laminations of the plurality of rotor laminations with at least one radial bulge are rotated relative to one another by a defined offset angle which is larger than the angular range of the at least one radial bulge,
  Applying a joining agent, in particular an adhesive, to an outer surface of the rotor blade stack, preferably between the radial bulges, and/or to an inner surface of a hollow-cylindrical body, and
  Pushing the hollow-cylindrical body onto the rotor blade stack.

As already mentioned at the beginning, a rotor blade stack can be constructed from a stack of rotor laminations particularly simply. By virtue of the plurality of adjacent rotor laminations with a radial bulge and rotated relative to one another by a defined offset angle, it is possible to selectively influence the requirements of the adhesive used with regard to its permeability and. Axial and radial empty spaces between the radial bulges and in which the adhesive can effectively spread over the whole circumference of the bonding gap such that it is not hampered by local accumulations of material at the bulges are thus formed by an offset angle which is larger than the angular range of the at least one radial bulge. The offset angle by which adjacent rotor laminations with at least one radial bulge are rotated relative to one another corresponds to at least twice the value of the angular range of the at least one radial bulge or is preferably at least 30°, particularly preferably approximately 60°.

In a further embodiment of the method according to the disclosure, each rotor lamination of the rotor blade stack has at least one radial bulge and is rotated by the offset angle with respect to their adjacent rotor lamination. After the joining agent, in particular the adhesive, has been applied, the hollow-cylindrical body is pushed onto the bulges of the rotor blade stack with a small amount of play. It can be provided here that the rotor blade stack and the hollow-cylindrical body are rotated relative to one another during the joining process. When the rotor blade stack and the hollow-cylindrical body are joined together, the radial bulges ensure the adequate bonding gap and at the same time locally minimize the play between the components to be joined. Consequently, the resulting concentricity error at the outside of the hollow-cylindrical body with respect to the machine shaft is minimized, which significantly reduces the production costs of the electric machine in terms of rejected components or reworking.

The disclosure furthermore relates to an electric machine, in particular a brushless direct-current machine, with a rotor according to the disclosure or with a rotor produced according to the method according to the disclosure, and to an electric treatment device, in particular a handheld electric machine tool, having a corresponding electric machine.

An electric treatment device is understood within the context of the disclosure to mean, inter alia, battery- or mains-powered electric machine tools for treating workpieces by means of an electrically driven attachment. The electric treatment device can here take the form of both a handheld electric tool and a stationary electric machine tool. In this connection, typical electric machine tools are handheld or standing drills, screwdrivers, impact drills, hammer drills, demolition hammers, planes, angle grinders, orbital sanders, polishing machines, or the like. However, garden power tools such as lawnmowers, lawn trimmers, pruning saws, or the like are also possible electric treatment devices. The disclosure can furthermore be applied to axial flow machines in household and kitchen appliances such as washing machines, tumble driers, vacuum cleaners, mixers, etc.

BRIEF DESCRIPTION OF THE DRAWINGS

The disclosure is explained by way of example below with reference to FIGS. 1 to 6, wherein the same reference numerals in the Figures indicate the same components with a same function.

In the drawings:

FIG. 1 shows a view in cross-section of a three-phase electric machine, in particular a three-phase brushless direct-current machine, with a rotor according to the prior art having four buried magnets (FIG. 1a) and with a magnetic ring according to the prior art having four surface magnets (FIG. 1b)

DETAILED DESCRIPTION

Figure 1A:
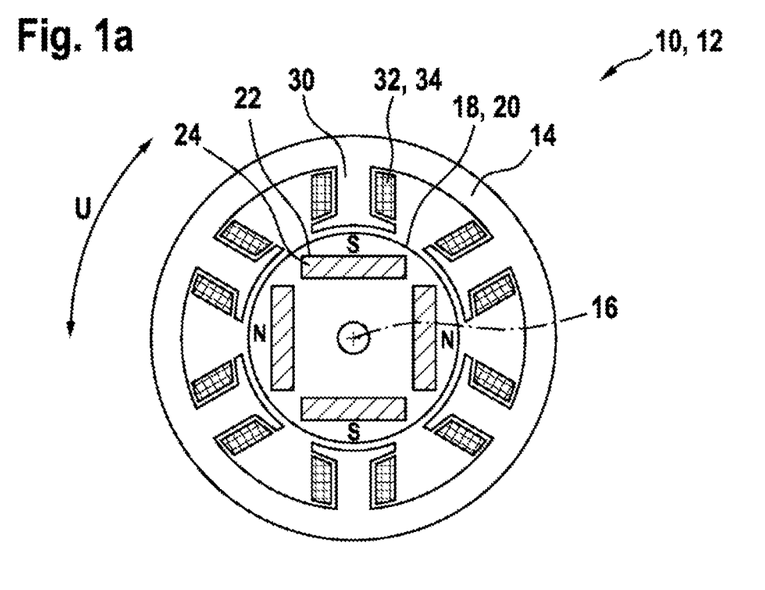
Figure 1B:
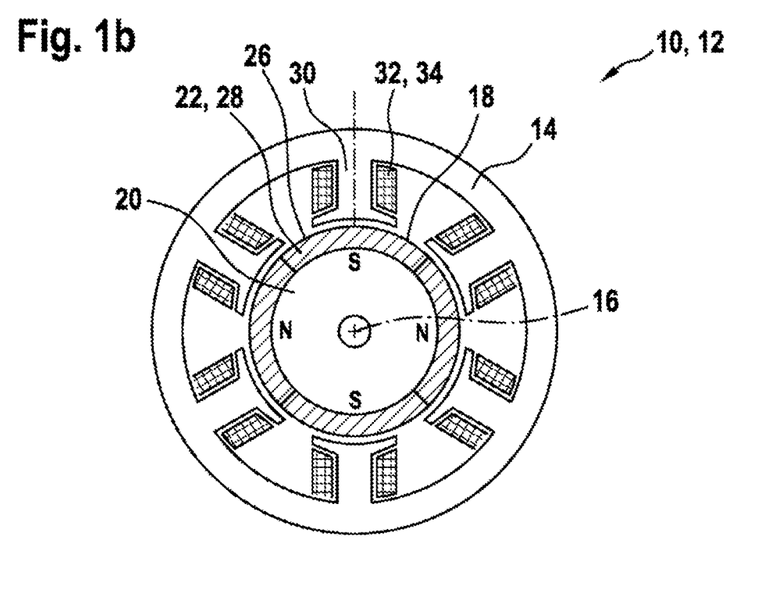

FIGS. 1a and 1b each show a view in cross-section through a three-phase electric machine 10, in particular a three-phase brushless direct-current machine 12, with a stator 14 and a rotor 18 according to the prior art which is arranged non-rotatably on a machine shaft 16. The electric machine 10 equally take the form of an electric motor or a generator. The rotor 18 of the electric machine 10 comprises a hollow-cylindrical core 20 which, according to FIG. 1a, has an even-numbered plurality of permanent magnets 24 which are buried in pockets 22 and alternate in polarity N, S in the circumferential direction U of the rotor 18. FIG. 1b shows an alternative embodiment of the rotor 18 with a hollow-cylindrical body 26, in the form of a magnetic ring, with corresponding permanent magnets 22 in the form of surface magnets 28. In each case four permanent magnets 22 are illustrated in both exemplary embodiments and themselves form two pairs of rotor poles. The stators 14 according to FIGS. 1a and 1b each have six radially inward directed stator teeth 30 which themselves each carry an individual tooth winding 32 of a stator winding 34. A stator 14 defines with its stator teeth 30 a cylindrical cavity in which the rotor 18 is arranged so that it can move in rotation relative to the stator 14. A rotating magnetic field, which entrains the permanently excited rotor 18 when the motor is running, is generated by means of the stator winding 34. Alternatively, it is also conceivable that the rotor 18 induces a voltage in the stator winding 34 in generator mode.

Figure 2:
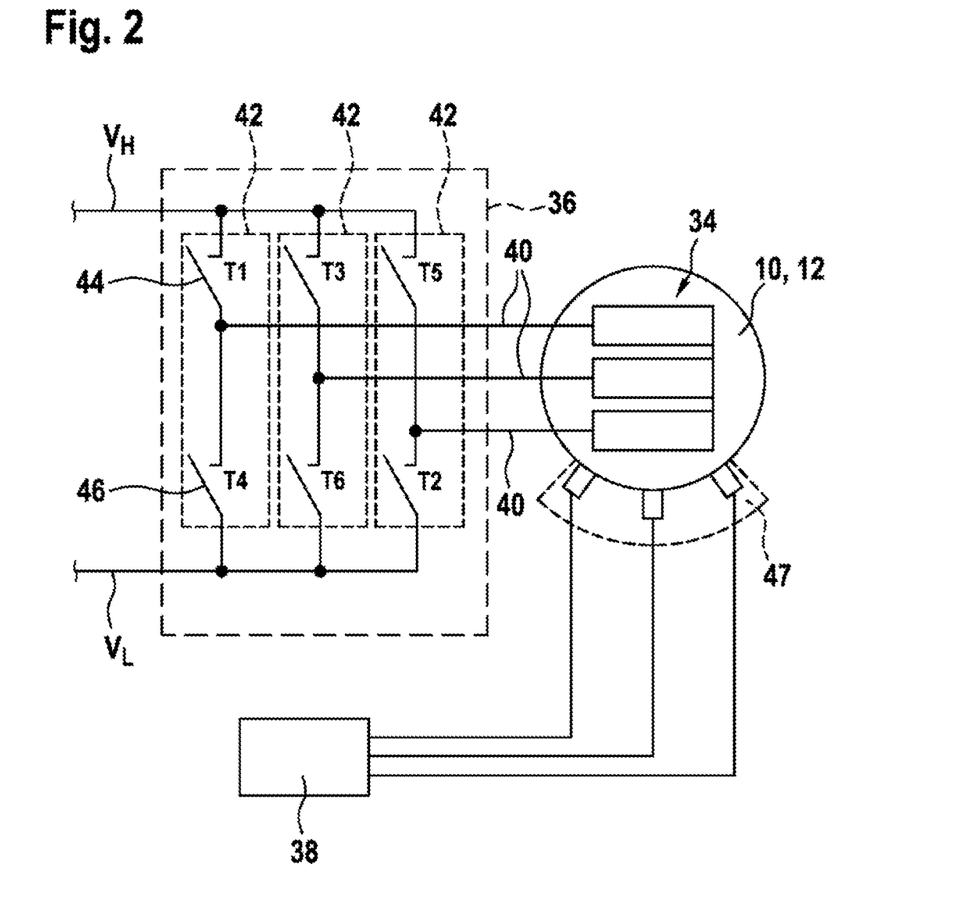
FIG. 2 shows a circuit diagram of a driver circuit according to the prior art for controlling the electric machine according to FIG. 1.

An example of a power output stage 36, which is controlled with the aid of a closed- or open-loop control unit 38, is illustrated in FIG. 2. The power output stage 38 has a half-bridge 42, in the form of an inverter circuit, per phase line 40 of the stator winding 34 connected in a delta circuit. Each half-bridge 42 consists of a first power switch 44, which is connected to a high supply potential VH (high side), and a second power switch 46, which is connected to a low supply potential VL (low side). The power switches 44, 46 can take the form of semiconductor switches in the form of IGBT, IGCT, thyristors, power MOFSETs, or the like but also of a relay. The closed- or open-loop control unit 38 controls the power switches 44, 46 in order to energize in each case two phase lines 40 according to a pulse width modulation (PWM) in such a way that one of the first power switches 44 (for example, T1) of one of the three half-bridges 42 is closed, whilst the two other first power switches 44 (T3, T5) are opened, and that one of the second power switches 46 (for example, T2) of a further one of the half-bridges 42 is closed, whilst the two remaining second power switches 46 (T4, T6) are opened. In this way, in order to generate the rotating magnetic field, the first power switches 44 and the second power switches 46 can be switched alternately by means of three rotor position sensors 47, which for example take the form of Hall effect sensors, in such a way that four individual tooth windings 28 of the stator winding 30 are energized at all times such that during operation the resulting stator flux is on average oriented perpendicularly to the rotor flux. This type of circuit is known to a person skilled in the art such that no further detail needs to be described here.

Figure 3:
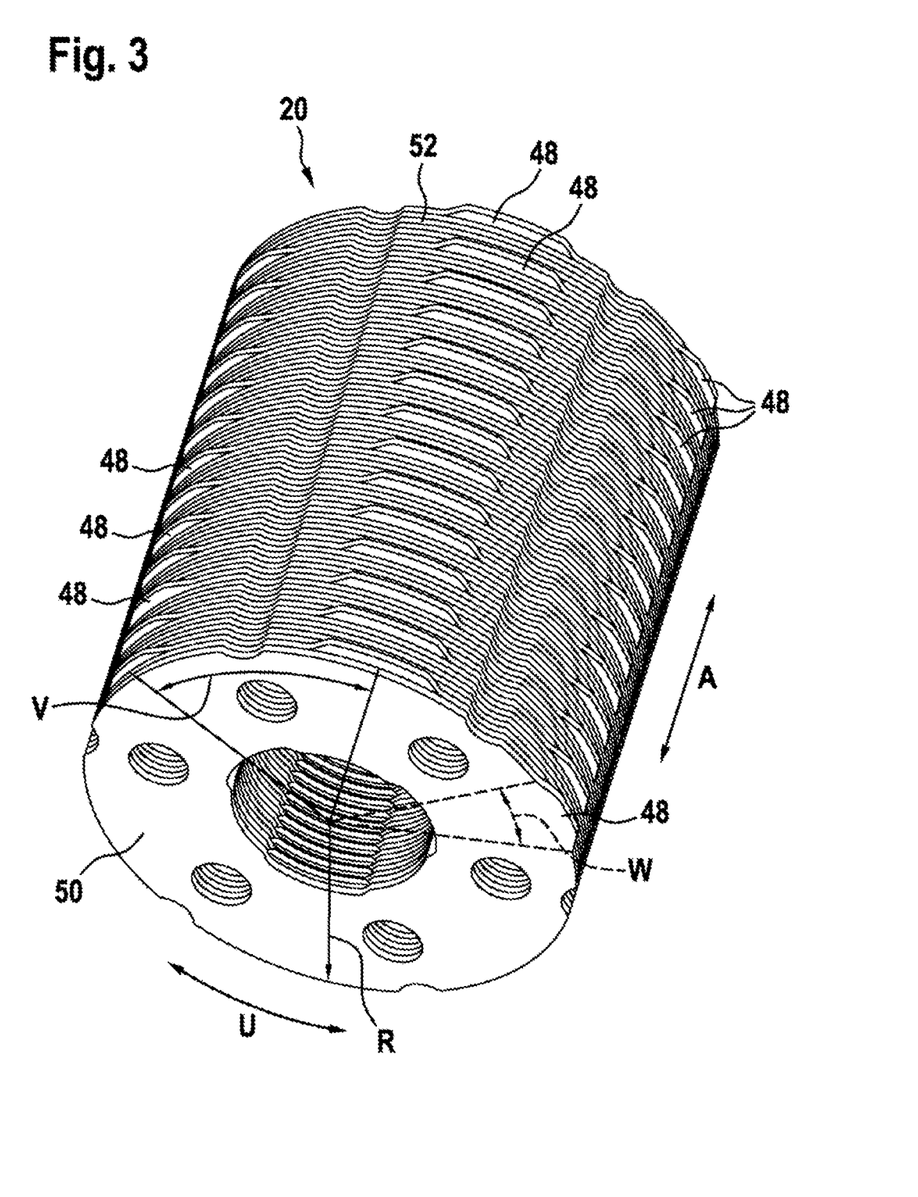
FIG. 3 shows an exemplary embodiment of a rotor blade stack according to the disclosure in a perspective view.

According to the disclosure, it is then described in FIGS. 3 to 6 that the hollow-cylindrical core 20, connected non-rotatably to the motor shaft 16, of the rotor 18 has a plurality of radial bulges 48 which are offset relative to one another by a defined offset angle V in a circumferential direction U and in an axial direction A over its outer surface. According to FIG. 3, each radial bulge 48 is here delimited over an angular range W which is smaller than the offset angle V of the radial bulges 48. FIG. 3 shows the structure of the hollow-cylindrical core 20 as a rotor blade stack 52 consisting of rotor laminations 50. For this purpose, the rotor laminations 52 are accordingly stacked one above or next to another (depending on the viewing direction).

The offset angle V of two radial bulges 48 which are adjacent in the circumferential direction U corresponds at least to twice the value of the angular range W of the at least one radial bulge 48. The offset angle V is preferably at least 30°, particularly preferably approximately 60°.

Figure 4:
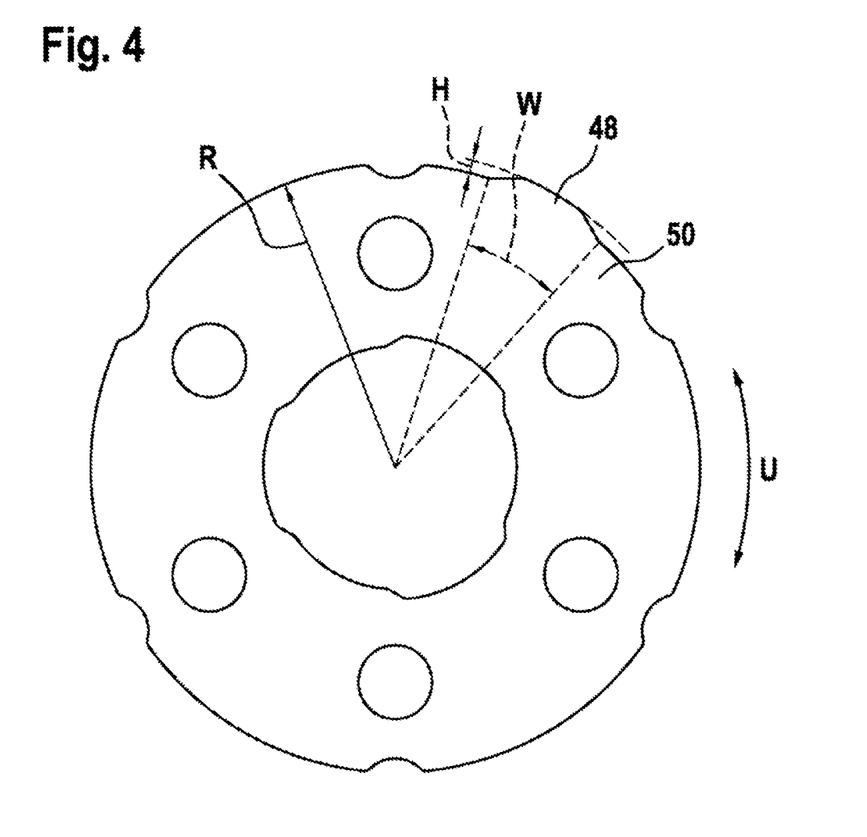
FIG. 4 shows an exemplary embodiment of a rotor lamination according to the disclosure in a plan view.

With reference to the production method according to the disclosure of the rotor 18, a plurality of rotor laminations 50 of the rotor blade stack 52 in each case have at least one radial bulge 48 delimited over the angular range W. FIG. 4 shows such a rotor lamination 50 in a plan view. The rotor laminations 50 are then stacked to form the rotor blade stack 52 in such a way that adjacent rotor laminations 50 of the plurality of rotor laminations 50 with at least one radial bulge 48 are rotated relative to one another by the defined offset angle V. It is completely possible here, in a variant of the exemplary embodiment according to FIG. 3, to provide rotor laminations 50 with no radial bulge between rotor laminations 50 with at least one radial bulge 48. It is likewise conceivable to use rotor laminations 50 with a plurality of radial bulges 48, the respective angular range W of which is smaller than the offset angle V.

Figure 5:
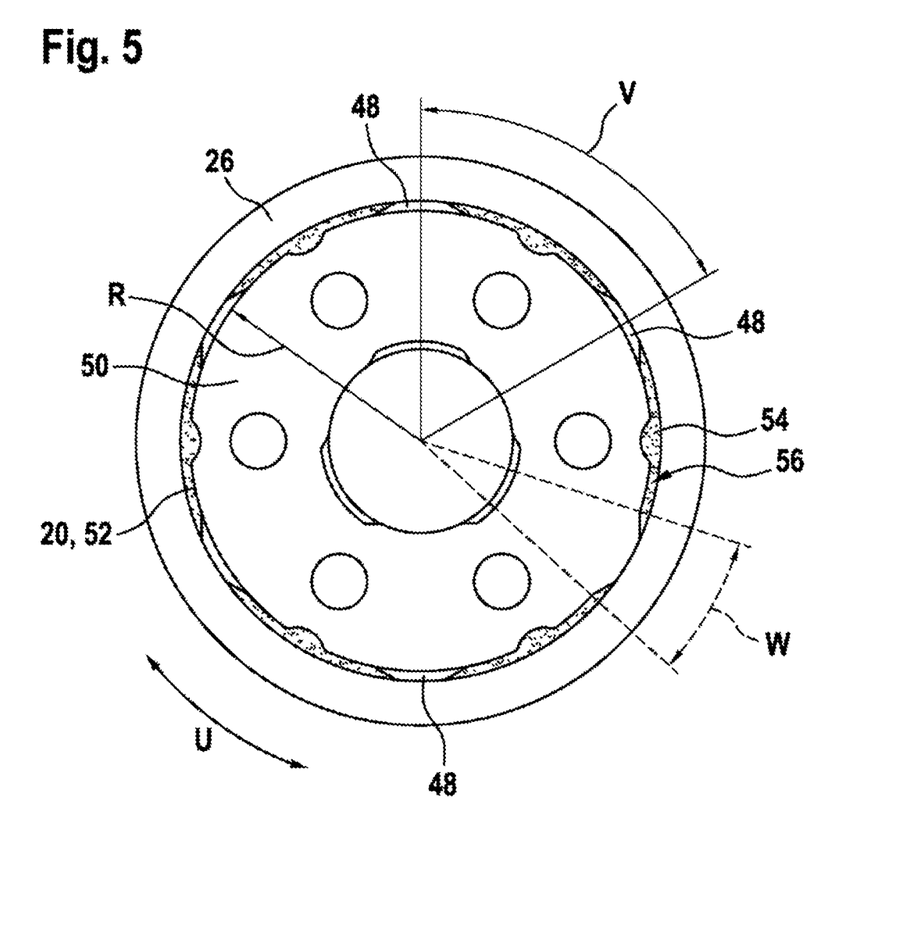
FIG. 5 shows the rotor blade stack according to the disclosure according to FIG. 3 with the hollow-cylindrical body pushed over it in a front view.
Figure 6:
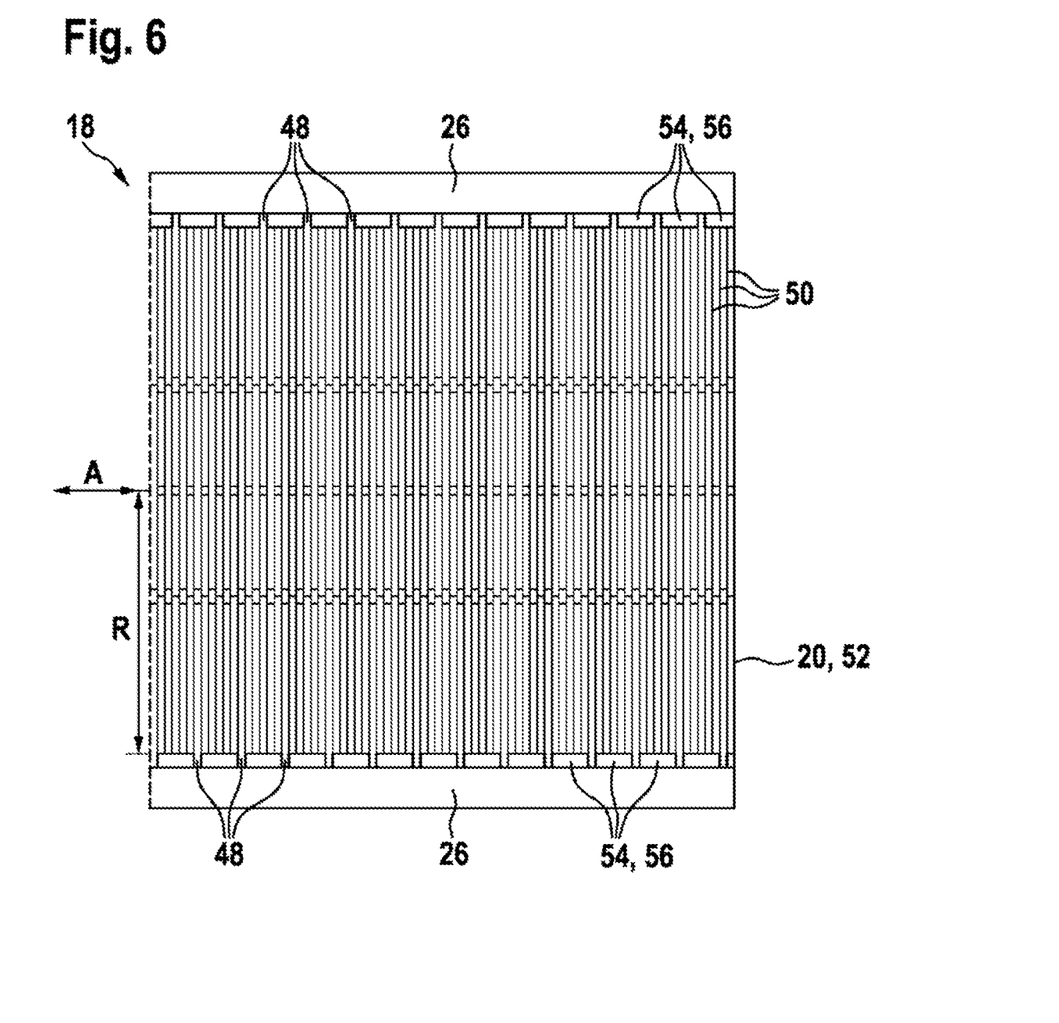
FIG. 6 shows the rotor blade stack according to the disclosure according to FIGS. 3 and 5 with the hollow-cylindrical body pushed over it in an axial section.

According to FIG. 5, for the procedure of joining the rotor blade stack 52 or the hollow-cylindrical core 20 to the hollow-cylindrical body 26 surrounding the latter, a joining agent 54, in particular an adhesive, is applied to the outer surface of the rotor blade stack 52 or the hollow-cylindrical core 20, preferably between the radial bulges 48, and/or to an inner surface of the hollow-cylindrical body 26, and the hollow-cylindrical body 26 according to FIG. 6 is then pushed in an axial direction A onto the rotor blade stack 52 or the hollow-cylindrical core 20 in order to permanently connect the two components such that a bonding gap 56 is formed between them. The rotor blade stack 52 and the hollow-cylindrical body 26 are here preferably rotated relative to one another during the joining process. In order to absorb any temperature-related expansions of the rotor blade stack 52 or the hollow-cylindrical core 20 as a consequence of operation of the electric machine 10 with high power demands, there is a small amount of play between the radial bulges 48 and the inner surface of the hollow-cylindrical body 26. The hollow-cylindrical body 26 usually takes the form of a magnetic ring which has the same axial structural length as the core 20. It is, however, also possible, without limiting the disclosure, that the hollow-cylindrical body 26 and the core 20 have different axial lengths. Thus, the hollow-cylindrical body 26 can therefore also take the form of a protective sleeve of the rotor 10, of a sensor ring, or the like.

Depending on the adhesive used and the associated optimal bonding gap 56 or joining procedure, the radial bulges 48 of the core 20 or the rotor blade stack 52 over an angular range W of less than 30°, preferably less than 20°, particularly preferably approximately 10°, exceed the maximum radius R that exists over the remaining outer surface of the core 20 or the rotor blade stack 52 by a height H of approximately 0.01% to 5%, preferably of approximately 0.02% to 2% (cf FIG. 4).

The radial bulges 48 thus, on the one hand, locally narrow the play between the components to be joined such that the possible concentricity errors are minimized directly without the additional incorporation of additional spacer particles. On the other hand, the defined bonding gap 56 is ensured in all other regions between the two components in order to ensure the curing of the adhesive and hence the mechanical resistance of the adhesive connection and to ensure axial and radial permeability of the adhesive such that it can spread unhindered in the whole bonding gap 56 during the joining procedure.

It should finally be pointed out that the disclosure is not limited to either the exemplary embodiment shown according to FIGS. 3 to 6 or to the illustrated form and number of the rotor laminations 50 and their radial bulges 48.

The invention claimed is:

1. A rotor for an electric machine which is connectable to a machine shaft, comprising:
   a hollow-cylindrical core configured to be connected non-rotatably to the machine shaft,
   a hollow-cylindrical body surrounding the hollow-cylindrical core,
   wherein the hollow-cylindrical core is formed by a rotor blade stack that includes a plurality of rotor laminations, each of the plurality of rotor laminations immediately adjacent to at least one other of the plurality of rotor laminations,
   wherein each of the plurality of rotor laminations has a first maximum radius at a location of an outer surface which does not include a radial bulge, and a second maximum radius at a location of the outer surface which does include a radial bulge, the second maximum radius greater than the first maximum radius,
   wherein the radial bulge of each of the plurality of rotor laminations is offset relative to the radial bulge of each of the immediately adjacent at least one other of the plurality of rotor laminations by a defined offset angle in the circumferential direction such that the second maximum radius of each of the plurality of rotor laminations is radially aligned with the first maximum radius of each of the immediately adjacent at least one other of the plurality of rotor laminations,
   wherein each radial bulge is delimited over an angular range which is smaller than the offset angle, and
   wherein the hollow-cylindrical core is permanently connected to the hollow-cylindrical body by way of a joining process.

2. The rotor as claimed in claim 1, wherein each rotor lamination of the rotor blade stack has at least one radial bulge and is rotated relative to its adjacent rotor lamination by the offset angle.

3. The rotor as claimed in claim 1, wherein the offset angle corresponds to at least twice the value of the angular range of each radial bulge.

4. The rotor as claimed in claim 3, wherein the offset angle is at least 30°.

5. The rotor as claimed in claim 4, wherein the offset angle is at least 60°.

6. The rotor as claimed in claim 1, wherein each radial bulges over an angular range of less than 30° exceeds the first maximum radius by a height of approximately 0.01 to 5%.

7. The rotor as claimed in claim 1, wherein the hollow-cylindrical body is a magnetic ring, a protective sleeve, or a sensor ring.

8. An electric machine with a rotor as claimed in claim 1.

9. An electric treatment device with an electric machine as claimed in claim 8.

10. The rotor as claimed in claim 1, wherein the hollow-cylindrical core is adhesively bonded to the hollow-cylindrical body by way of the joining process.

11. The rotor as claimed in claim 1, wherein each of the radial bulges of the hollow-cylindrical core over an angular range of less than 10° exceed the first maximum radius by a height of approximately 0.02% to 2%.

12. A method for producing a rotor for an electric machine comprising:
   using rotor laminations for a rotor blade stack of the rotor, wherein each of a plurality of the rotor laminations has a first maximum radius at a location of an outer surface which does not include a radial bulge, and a second maximum radius at a location of the outer surface which does include a radial bulge, the second maximum radius greater than the first maximum radius,
   stacking the rotor laminations to form the rotor blade stack with immediately adjacent ones of the plurality of rotor laminations which are rotated relative to one another by a defined offset angle which is larger than an angular range of the radial bulges of the immediately adjacent ones of the plurality of rotor laminations such that the second maximum radius of each of the immediately adjacent ones of the plurality of rotor laminations is radially aligned with the first maximum radius of immediately adjacent ones of the plurality of rotor laminations,
   applying a joining agent to an outer surface of the rotor blade stack and/or to an inner surface of a hollow-cylindrical body, and
   pushing the hollow-cylindrical body onto the rotor blade stack.

13. The method as claimed in claim 12, wherein each rotor lamination of the rotor blade stack is one of the plurality of rotor laminations.

14. The method as claimed in claim 12, wherein the pushing step includes pushing the hollow-cylindrical body onto the bulges of the rotor blade stack with a small amount of play.

15. The method as claimed in claim 12, wherein the offset angle corresponds to at least twice the value of the angular range of each of the radial bulges and is at least 30°.

16. The method as claimed in claim 15, wherein the offset angle is at least 60°.

17. The method as claimed in claim 12, wherein the rotor blade stack and the hollow-cylindrical body are rotated relative to each other during the joining process.

18. The method of claim 12, wherein the applying step includes applying the joining agent between the radial bulges.

19. An electric machine with a rotor produced according to the method as claimed in claim 12.

* * * * *

UNITED STATES PATENT AND TRADEMARK OFFICE
CERTIFICATE OF CORRECTION

| | |
|---|---|
| PATENT NO. | : 12,119,711 B2 |
| APPLICATION NO. | : 17/779912 |
| DATED | : October 15, 2024 |
| INVENTOR(S) | : Pagoni et al. |

Page 1 of 1

It is certified that error appears in the above-identified patent and that said Letters Patent is hereby corrected as shown below:

In the Claims

In Claim 6, at Column 8, Lines 12-13: "each radial bulges" should read --each radial bulge--.

Signed and Sealed this
Twenty-fifth Day of March, 2025

Coke Morgan Stewart
*Acting Director of the United States Patent and Trademark Office*